US008804515B2

(12) United States Patent
Kampmann et al.

(10) Patent No.: US 8,804,515 B2
(45) Date of Patent: Aug. 12, 2014

(54) TECHNIQUE FOR DYNAMICALLY CONTROLLING DATA PACKET TRANSMISSIONS

(75) Inventors: Markus Kampmann, Aachen (DE); Christoph Plum, Huckelhoven (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1702 days.

(21) Appl. No.: 11/911,246

(22) PCT Filed: Apr. 11, 2005

(86) PCT No.: PCT/EP2005/003785
§ 371 (c)(1),
(2), (4) Date: Nov. 9, 2007

(87) PCT Pub. No.: WO2006/108434
PCT Pub. Date: Oct. 19, 2006

(65) Prior Publication Data
US 2008/0186849 A1    Aug. 7, 2008

(51) Int. Cl.
*H04L 29/06* (2006.01)
*H04L 12/56* (2006.01)
(52) U.S. Cl.
CPC ............ *H04L 65/608* (2013.01); *H04L 65/607* (2013.01); *H04L 29/06027* (2013.01); *H04L 65/80* (2013.01); *Y02B 60/31* (2013.01); *H04L 47/30* (2013.01); *H04L 47/263* (2013.01); *H04L 47/29* (2013.01)
USPC .......................................... 370/232; 370/391
(58) Field of Classification Search
CPC ......... H04L 47/29; H04L 47/00; H04L 47/30; H04L 29/06027; H04L 47/2263

USPC .......................................................... 709/231
See application file for complete search history.

(56) References Cited

U.S. PATENT DOCUMENTS

| 7,003,794 | B2* | 2/2006 | Arye .............................. 725/100 |
| 7,536,469 | B2* | 5/2009 | Chou et al. .................... 709/231 |
| 7,542,435 | B2* | 6/2009 | Leon et al. ..................... 370/278 |
| 2003/0142744 | A1* | 7/2003 | Wu et al. .................. 375/240.03 |
| 2003/0151753 | A1* | 8/2003 | Li et al. ........................... 358/1.9 |
| 2003/0189907 | A1 | 10/2003 | Miyamoto |
| 2004/0098748 | A1 | 5/2004 | Bo et al. |

FOREIGN PATENT DOCUMENTS

WO    WO 2004/039034 A    5/2004

OTHER PUBLICATIONS

Rijsinghani; RFC Computation of the Internet Checksum via Incremental Update; May 1994; pp. 1-6; Network Working Group; Digital Equipment Corporation; Littleton, MA, USA.

(Continued)

*Primary Examiner* — Asad Nawaz
*Assistant Examiner* — Jason Harley

(57) ABSTRACT

A technique is disclosed for controlling data packet transmissions from a server to a client having a client buffer in accordance with a waiting mode and a dynamic mode. The waiting mode is performed before packets containing data encoded subject to a current bit rate have reached the client buffer; the dynamic mode is performed otherwise. In the waiting mode, down-switches to lower bit rates are allowed but up-switches to higher bit rates are disabled. In the dynamic mode, up-switches and down-switches are both allowed, with adjustments in the bit rate of packets controlled based, in part, on the amount of data contained within the client buffer when packets containing data encoded subject to the current bit rate first reached the client buffer. The two modes help avoid unnecessary rate switches.

17 Claims, 6 Drawing Sheets

(56) References Cited

OTHER PUBLICATIONS

3GPP Organizational Partners; 3GPP-TS-26.233 Transparent End-to-End Packet Switched Streaming Service (PSS) General Description (Release 7); http://www.3gpp.org; Jun. 2007; pp. 1-14; v7.0.0; Valbonne, France.

3GPP Organizational Partners; 3GPP-TS-26.234 Transparent End-to-End Packet Switched Streaming Service (PSS); Protocols and Codecs; (Release 7); http://www.3gpp.org; Sep. 2007; pp. 1-149; v7.4.0; Valbonne, France.

* cited by examiner

TECHNIQUE FOR DYNAMICALLY CONTROLLING DATA PACKET TRANSMISSIONS

FIELD OF THE INVENTION

The invention relates to the communication of data and, more specifically, to a technique for controlling streaming data packet transmissions.

BACKGROUND OF THE INVENTION

Increasing amounts of data are being transmitted from servers to clients via communication infrastructures such as packet-based Internet Protocol (IP) networks. One particular application that is increasing in popularity is multimedia streaming. However, improvements must be made in providing reliable data streams before wide-spread adoption of such services. For example, as data transmission link rates between the IP network and a client device of a user tend to fluctuate, any disturbances in data delivery to the user may result in severe degradation of the playout to the end user, i.e. a degradation in the quality of the media observed by the user. In particular, it is important that there be a sufficient supply of packets of data at the client device to be fetched by a multimedia application as playout (i.e., the display of the multimedia file by the multimedia application or player) progresses.

In many cases, the packet transmission rate cannot be changed, as this rate depends upon the bandwidth of communication link (or it is at least impractical to change the packet transmission rate). However, the rate at which data is fed to the output device of the user often must be changed. Typically, for streaming applications, such adjustments are achieved using "stream switching". With stream switching, the same media content, e.g. a particular video sequence, is pre-encoded at different bit rates and stored at the server. Hence, different versions of the same stream are available. During transmission, the server selects the particular version that has a data bit rate most appropriate based upon the current available bandwidth in the network and based upon the status of the client buffer. Switching logic employed by the server decides if and when to switch to another version of the stream. In the case of a so-called "down-switch", the stream is switched to a version with a lower encoded bit rate. In the case of an "up-switch", the switch is made to a version with a higher encoded bit rate. In many implementations, the criteria for switching employs predefined thresholds defined with respect to client buffer status. In one example, thresholds are based upon a buffer fill level, which represents the amount of data within the client buffer in bytes. In another example, the thresholds are based upon a play-out length (PT) of stored media in the client buffer, which represents the amount of time in seconds it will take for the data already within the client buffer to be played out to the user. Herein, examples involving playout length are described, though buffer fill level or other appropriate parameters can instead be used.

Some conventional techniques for determining the status of the client buffer utilize information within Real Time Transport Control Protocol (RTCP) receiver reports (RRs). Information pertaining to the next sequence number (NSN) or oldest buffered sequence number (OBSN) within the client buffer and the highest received sequence number (HRSN) within the client buffer is contained with the RR and is used to determine the consumed buffer space as the size of each packet within the range from the HRSN to the NSN/OBSN is known. If the free space within the client buffer is below a preferred client buffer fill level, then a different version of the stream is selected. For example, if buffer playout length (PT) falls below a predetermined minimum threshold ($PT_{DOWN}$), then a risk of buffer draining occurs, i.e. the client buffer becomes empty such that there is no data to stream to the user. This results in a playout freeze, wherein the last image displayed to the user is typically frozen until a sufficient amount of additional data can be added to the client buffer to restart the stream to the output device employed by the user, i.e. a "rebuffering" of the client buffer is required. Rebuffering can be extremely annoying from the standpoint of the user.

To avoid possible rebuffering due to client buffer draining, the server detects when the playout length (PT) within the client buffer drops below threshold $PT_{DOWN}$, and then adjusts the bit rate (i.e. selects a version of the stream having a different bit rate) in an attempt to prevent the client buffer from becoming completely drained. More specifically, the server performs a down-switch, i.e. a switch to a lower bit rate stream. The reason that a down-switch is performed, rather than up-switch, is that the most likely reason that the client buffer is being drained is that the link rate between the server and the client buffer is less than anticipated, i.e. the effective bandwidth is less than needed for the bit rate currently being used. As a result, data is not being received by the client buffer at the same rate at which the client buffer is feeding data to the output device of the user. Hence, the client buffer, which should remain fairly well populated with data, becomes drained. By switching to the lower bit rate, the client buffer feeds data to the display unit at a lower rate, thereby allowing more time for data to be received from the server, and thereby preventing the client buffer from becoming completely drained. From the standpoint of the user, the quality of the media stream is downgraded because of the down-switch, e.g. the size of the displayed image of the video stream becomes smaller, the resolution of the image becomes less, or higher distortions are observed in the image. Yet, this is preferable to the aforementioned playout freeze that occurs during rebuffering.

On the other hand, if buffer playout (PT) length exceeds a predetermined maximum threshold ($PT_{UP}$), then a risk of buffer overflow occurs, i.e. the client buffer becomes full such there is no room for additional packets. Any packets received by the client buffer but not stored therein are typically not re-sent by the server and hence the data of those packets are simply not forwarded to the output device of user. Once the client buffer is again capable of storing packets, the data stream resumes with the new packets. Thus, from the standpoint of the user, there is a sudden loss of content as the stream simply jumps ahead. In the case of a film or movie, dialogue can be lost, thus interfering with the ability of the user to follow story. In the case of music, the song simply jumps ahead. As will be appreciated, this can be quite annoying from standpoint of the user as well.

To avoid a disruption of the stream due to client buffer overflow and to enhance media quality at the same time, the server detects when the playout length (PT) within the client buffer exceeds threshold $PT_{UP}$ and then performs an up-switch, i.e. a switch to a higher bit rate stream. The reason that an up-switch is performed, rather than down-switch, is that the most likely reason that the client buffer is becoming to full is that the link rate between the server and the client buffer is greater than anticipated, i.e. the effective bandwidth is greater than needed for the bit rate currently being used. As a result, data being received by the client buffer at a rate higher than the rate at which the client buffer feeds the data to the output device of the user. Hence, the client buffer overflows. By switching to the higher bit rate, the client buffer feeds data to the output device at the higher rate, thereby preventing the client buffer from overflowing. From the standpoint of the user, the quality of the media stream is improved due to the up-switch, e.g. the size of the displayed image of the video stream becomes larger or the resolution of the image becomes greater. Hence, the up-switch helps prevent interruption of the stream and improves media quality, which both benefit the user.

Simple logic for performing up-switches and down-switches may be represented as follows:

---

If PT > $PT_{UP}$ then
    Perform up-switch
else if PT < $PT_{DOWN}$
    Perform down-switch
end if.

---

Appropriate selection of these thresholds is critical to the overall media impression of the user. In the case of down-switch that is performed too late, a rebuffering event will happen. In the case of an up-switch that is performed too late, the user receives a lower quality media then is otherwise necessary and, as noted, a break in the data stream may occur as the result of a buffer overflow. Likewise, if a down-switch is performed earlier than necessary, the user receives a lower quality media than is otherwise necessary. If an up-switch is performed earlier than necessary, a down-switch may then soon be required, resulting in annoying fluctuations in the quality of the media. To avoid these problems, multiple down-switch thresholds and multiple up-switch thresholds can potentially be used. As playout length decreases towards buffer drainage, a series of the down-switch thresholds are crossed, each triggering a down-switch. Conversely, as playout length increases towards buffer overflow, a series of up-switch thresholds are crossed, each triggering an up-switch.

However, after a switch has occurred and a stream with the new bit rate has been transmitted, it takes some time before the switch has any effect on the playout length of the client buffer. First, there is a transmission delay until a first packet containing data encoded at the new rate reaches the client buffer. During this time period, the playout length of the stored media in the client buffer is unaffected by the new rate. Hence, if the playout length was increasing toward a possible buffer overflow, it will likely continue to increase. Conversely, if the playout length was a decreasing toward possible buffer drainage, it will likely continue to decrease. Also, even after the arrival of the first packet at the new bit rate, the playout length may change only slowly at first. For example, there may still be some packets sent with data at the previous bit rate that had not yet been received by the client buffer. Therefore, the switching conditions are often still valid and several switches then follow a first switch, which are often unnecessary. In the case of a first down-switch, several further down-switches may be performed, resulting in a stream bit rate that is much lower than necessary. Often, the down-switches do not stop until the lowest stream bit rate has been selected. This behavior results in an unnecessarily low media stream quality for the user. In the case of an up-switch, several further up-switches can happen, resulting in a stream bit rate that is too high, often to the highest rate possible. This results in a stream bit rate that is much too high compared with the current available network bandwidth, triggering a series of down-switches.

As a result, frequent and annoying variations in stream quality are observed by the user. Moreover, if a bit rate that is much too high has been selected, subsequent down-switches often cannot be executed fast enough, resulting in annoying rebuffering events and playout freeze. Likewise, if a bit rate that is much too low has been selected, subsequent up-switches often cannot be executed fast enough, resulting in annoying buffer overflows and associated loss of data. Even with only a single up-switch threshold and a single down-switch threshold, these sorts of problems can arise, particularly if the thresholds are set too close together.

Accordingly, there is a need for an improved technique for controlling stream switching so as to provide more stable and reliable content to user, and it is to this end that the invention is primarily directed.

SUMMARY OF THE INVENTION

The invention may be embodied in a method for controlling packet transmissions from a server to a client having a client buffer wherein a bit rate of data to be transmitted within the packets is selectable by the server based on a status of the client buffer. In accordance with the method, packets are initially transmitted containing data encoded subject to a current bit rate. The client buffer is monitored to detect a reference value ($PT_{CH}$) representative of an amount of data within the client buffer at a subsequent point in time. A value representative of an amount of data currently within the client buffer is also tracked (PT). Adjustments in the bit rate of data being transmitted are then controlled in accordance with a dynamic mode based on the value (PT) representative of the amount of data currently within the client buffer and based on the reference value (PTCH). By taking into account the reference value ($PT_{CH}$), as well as the value (PT), when controlling adjustments to bit rate, unnecessary adjustments in bit rate can be substantially avoided.

In one implementation, the step of detecting a reference value ($PT_{CH}$) representative of an amount of data within the client buffer at a subsequent point in time includes the step of: monitoring the client buffer (115) to detect when packets containing data encoded subject to the current bit rate first reach the client buffer (202); and detecting the reference value ($PT_{CH}$) representative of an amount of data within the client buffer at a point in time when the packets containing data encoded subject to the current bit rate first reached the client buffer (204). Alternatively, the reference value ($PT_{CH}$) could be detected at a point in time immediately after starting the transmission of packets containing data encoded subject to a current (new) bit rate and/or at any time between those two points in time.

In an up-switch example of the dynamic mode, the step of controlling adjustments in the bit rate is performed by switching to a higher bit rate if the amount of data (PT) currently within the client buffer exceeds an adjustable up-switch threshold ($PT_{UP-ADJ}$) set, in part, based on the reference value ($PT_{CH}$). The adjustable up-switch threshold ($PT_{UP-ADJ}$) may be set equal to a predetermined safety (S) margin multiplied by the reference value ($PT_{CH}$). The predetermined safety margin is usually set greater than or equal to 1.0 and, in one specific example, is set to 1.2. Also, in the example, the step of switching to a higher bit rate in the dynamic mode is only performed if the amount of data (PT) currently within the client buffer also exceeds a predetermined minimum threshold, which may be a fixed down-switch threshold ($PT_{DOWN}$).

In a down-switch example of the dynamic mode, the step of controlling adjustments in the bit rate of packets is performed by switching to a lower bit rate if the amount of data (PT) currently within the client buffer falls below an adjustable down-switch threshold ($PT_{DOWN-ADJ}$) set, in part, based on the reference value ($PT_{CH}$). The adjustable down-switch threshold ($PT_{DOWN-ADJ}$) may be set approximately midway between a predetermined minimum threshold ($PT_{DOWN}$) and the reference value ($PT_{CH}$). Also, in the example, the step of switching to a lower bit rate in the dynamic mode is alternatively performed if the amount of data (PT) currently within the client buffer also falls below the predetermined minimum threshold, which may be a fixed down-switch threshold ($PT_{DOWN}$).

Preferably, the step of controlling adjustments in the bit rate of packets in accordance with a dynamic mode is only performed after packets containing data encoded subject to a current bit rate have reached the client buffer. During a period of time after a rate adjustment but before packets containing data encoded subject to an adjusted bit rate have reached the client buffer, adjustments are instead controlled in accordance with a waiting mode. In the waiting mode, a decrease in the bit rate is performed if the amount of data (PT) currently within the client buffer falls below the down-switch threshold ($PT_{DOWN}$.) However, increases in the bit rate are disabled in the waiting mode.

In various implementations, the values representative amounts of data within the client buffer are representative of playout lengths (PT) of the data or buffer fill levels.

Depending on the implementation, the client may be a mobile communications terminal such as a mobile telephone, and in addition, or in the alternative, the server may be integrated into a mobile communications terminal so that the link between the server and the network may be wireless. In addition, the method may be performed by one or more intermediary network nodes (such as proxies) arranged between the server and the client. The method may also be utilized in architectures having plurality of data streams being buffered by the client buffer (or multiple client buffers depending on the configuration of the client).

The invention may also be embodied in a computer program product, which may be stored on a computer readable recording medium, comprising program code portions for performing any of the steps of the above methods when the computer program product is run on a computer system.

The invention may further comprise an apparatus comprising a computer processor and a memory coupled to the processor, where the memory is encoded with one or more programs that may perform any of the steps of the above methods.

In yet another embodiment, the invention relates to an apparatus for controlling packet transmissions from a server to a client having a client buffer wherein a bit rate of packets from server to client is adjustable by the server based on a current status of the client buffer. The apparatus comprises: a bit rate controller for starting to transmit data in packets at a current bit rate; a client buffer monitor for monitoring the client buffer to detect a reference value representative of an amount of data within the client buffer at a subsequent point in time; a tracking unit for tracking a value representative of an amount of data currently within the client buffer; and a dynamic mode controller for controlling adjustments in the bit rate of packets based on the value representative of the amount of data currently within the client buffer and based on the reference value.

In one implementation, the apparatus also includes a waiting mode controller for controlling adjustments in the bit rate of packets in accordance with a waiting mode.

The apparatus may be configured as a fixed or mobile network component, such as a network server and/or a wireless terminal. In addition, the apparatus may be constituted by an intermediary network node, such as a proxy.

BRIEF DESCRIPTION OF THE DRAWINGS

In the following the invention will be described with reference to exemplary embodiments illustrated in the figures, in which.

DETAILED DESCRIPTION OF THE PREFERRED EMBODIMENTS

In the following description, for purposes of explanation and not limitation, specific details are set forth, such as particular sequences of steps and various configurations, in order to provide a thorough understanding of the invention. It will be apparent to one skilled in the art that the invention may be practiced in other embodiments that depart from these specific details. Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the invention is primarily described as a method, it may also be embodied in a computer program product as well as a system or apparatus comprising a computer processor and a memory coupled to the processor, where the memory is encoded with one or more programs that may perform the methods disclosed herein.

Figure 1:
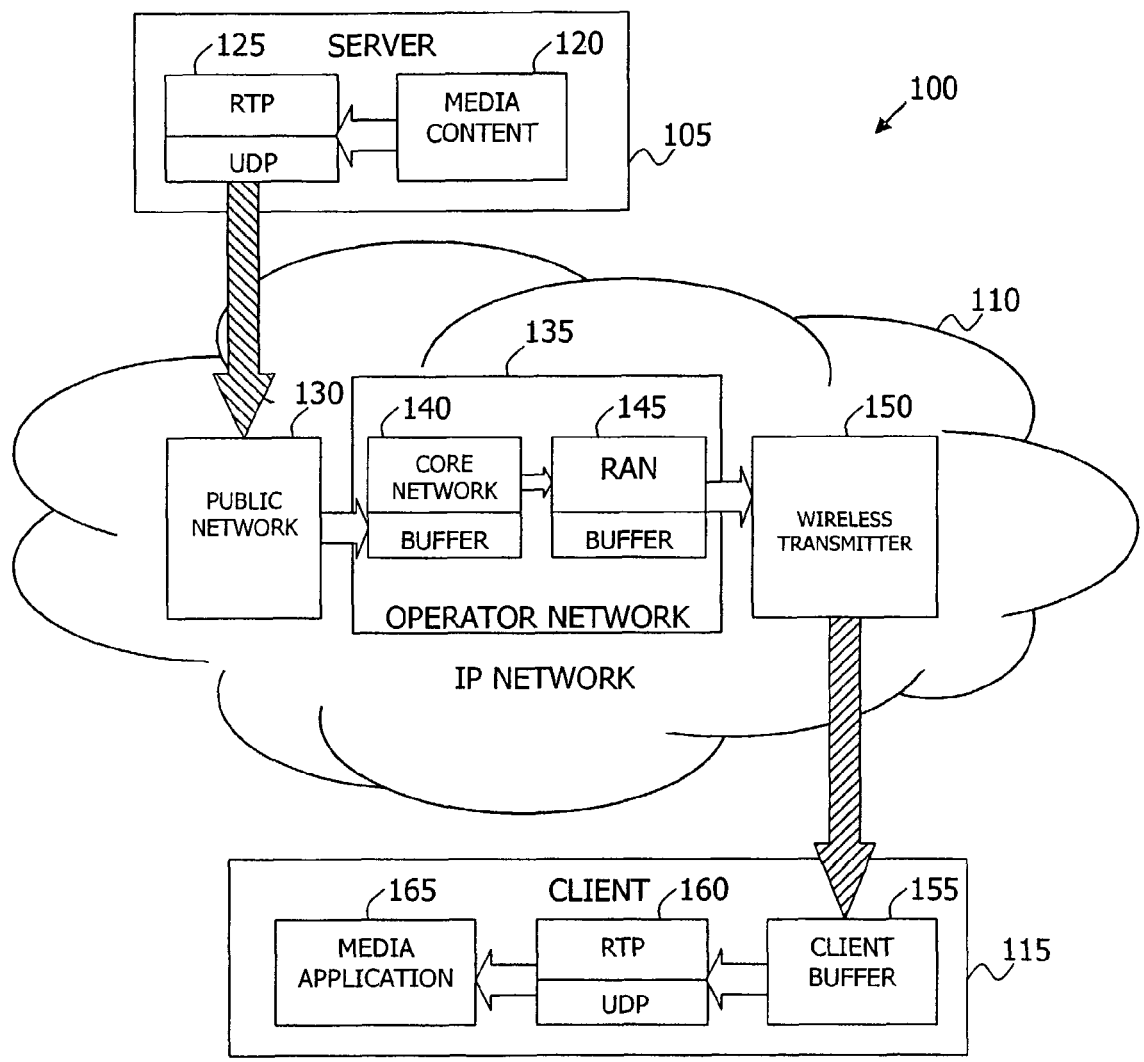
FIG. 1 is a schematic diagram of a communication system useful for understanding and implementing the invention.

FIG. 1 illustrates a sample architecture 100 that may be used in connection with the invention including a server 105 that may be coupled to a client 115 via a communications pathway such as an IP network 110. The server include a media content module 120 that accesses and transmits certain media content (e.g., multimedia data files) via a RTP/UDP module 125 using a streaming standard such as RTP (Real time Transport Protocol) over UDP or other data transport protocol for managing the real-time transmission of multimedia data (with a transport layer protocol such as UDP—User Datagram Protocol). The packets are transmitted to a public network 130 (e.g., the Internet, however, an external public network is not required when the server is directly coupled to the operator network 135) that delivers the packets to an operator network 135, such as a mobile communications operator "wired" network, coupled thereto.

The operator network 135 includes a core network 140 that provides communication links between the server 105 and the client 115. The core network 140, which may optionally have a buffer, provides the packets received from the RTP/UDP module 125 for buffering in a buffer within a radio access network (RAN) 145 (such as a buffer in the SGSN or in the RNC) prior to their transmission by a wireless transmitter

150. The buffers of the core network 140 (if buffering is utilized) and the RAN 145 are arranged in series and constitute a network buffer.

The client 115 receives the packets transmitted by the wireless transmitter 150 in a client buffer 155. The packets are transferred from the client buffer 155 to a RTP/UDP module 160 for delivery to and use by the media application module 165 (or multimedia player). For purposes of this application, the phrase "packet transmission rate" will refer to the rate of transmission of packets from the server 105 to the IP network 110, the phrase "link rate" will refer to the rate of transmission of packets from the IP network 110 to the client 115, and the phrase "bit rate" shall refer to the rate that data is transferred from the client buffer 115 to the media application module 165 for playout by the media application module 165. This is also sometimes called the "content rate".

Figure 2:
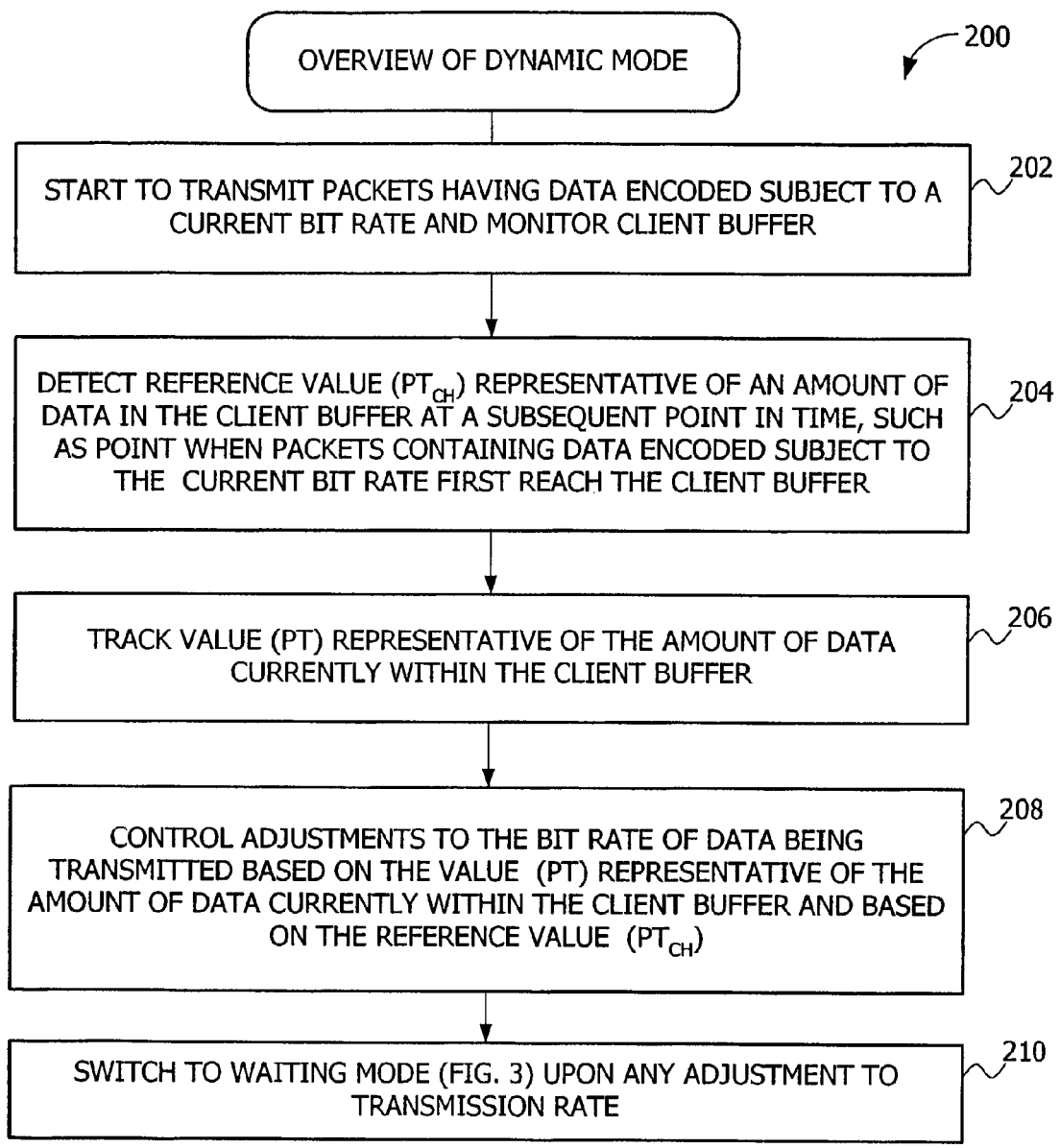
FIG. 2 is a process flow diagram providing an overview of a dynamic mode method embodiment of the invention.

With reference to FIG. 2, a method embodiment 200 of the invention is illustrated which may be performed, for example, by the system of FIG. 1. The method of FIG. 2 represents the dynamic mode of processing of the invention, which may be implemented alone or in combination with the waiting mode illustrated in FIG. 3. The method is preferably implemented by the server, such as a server 105 of FIG. 1, but may be implemented by any other appropriate network component. In the following descriptions, it will be assumed that a server implements the steps of the method. Beginning at step 202, the server starts transmitting packets of a multimedia stream encoded subject to a current bit rate and monitors the client buffer 155 (FIG. 1). The current bit rate may be set, for example, by selecting a pre-encoded version of the stream having a particular bit rate. At step 204, the server then stores a reference value representative of an amount of data within the client buffer at a subsequent point in time, such as when packets containing data encoded subject to the current bit rate first reached the client buffer. To detect when packets containing data encoded subject to the current bit rate first reach the client buffer, the server processes signals received from the client buffer. In one example, if the client buffer is implemented in accordance with RTCP protocols, the server receives feedback from the client buffer, which includes the NSN or HRSN data fields. Using the information in these data fields, the server can thereby detect, at least approximately, when packets containing data encoded subject to the current bit rate first reach the client buffer. As noted, the amount of data in a client buffer may be represented, for example, in terms of a playout length (PT), a client buffer fill level, or other appropriate value. In the following descriptions, examples will be described using playout length. When using playout length, the reference value detected at step 204 is referred to as $PT_{CH}$.

At step 206, the server tracks a value representative of the amount of data currently within the client buffer, i.e. PT. This may be performed in accordance with otherwise conventional techniques, e.g. using information in the NSN and HRSN data fields.

At step 208, the server then controls adjustments in the bit rate based on the value representative of the amount of data currently within the client buffer (detected at step 206) and based on the reference value (detected at step 204). In other words, the server controls adjustments in bit rate based upon both PT and $PT_{CH}$. By taking into account $PT_{CH}$, in addition to PT, the server is capable of avoiding many of the unnecessary rate switches that occur in conventional systems employing only fixed rate switched thresholds. For example, $PT_{CH}$ may be used to set adjustable up-switch and down-switch thresholds, which minimize unnecessary rate switching. Preferably, adjustable thresholds are set such that, after a previous up-switch, a further up-switch is executed only if the client buffer playout length is still increasing. Hence, any further up-switches that might be executed even if the client buffer playout length were already decreasing are avoided. After a previous down-switch, a further down-switch is executed only if the buffer playout length is still decreasing. Hence, any further down-switches that might be executed even if the client buffer playout length were already increasing are avoided. This is described in greater detail below with reference to the preferred implementation of FIG. 5.

Figure 3:
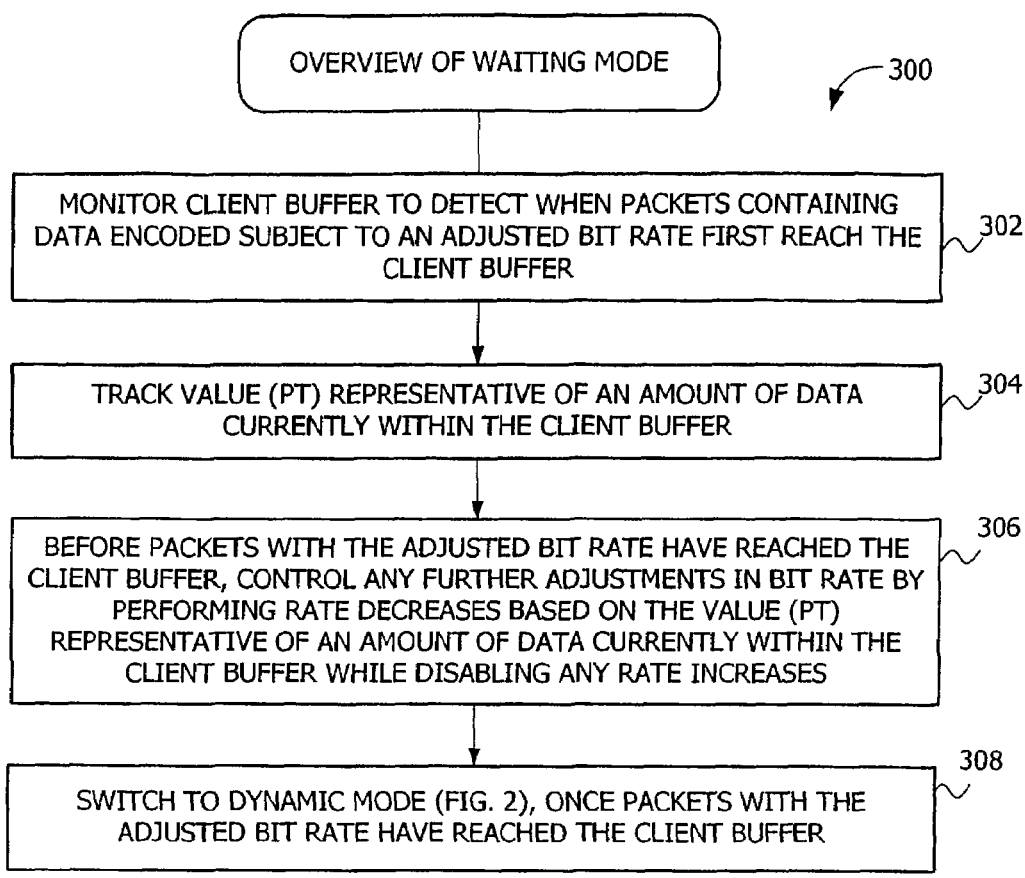
FIG. 3 is a process flow diagram providing an overview of a waiting mode method embodiment of the invention.

Finally with respect to FIG. 2, at step 210, upon any adjustments to bit rate made at step 208, the server switches to a waiting mode 300, which will now be summarized with reference to FIG. 3. As will be discussed below, the waiting mode can also be implemented alone, i.e. independently from the dynamic mode illustrated with reference to FIG. 2.

At step 302 of FIG. 3, the server again tracks a value representative of the amount of data currently within the client buffer, i.e. the playout length (PT). At step 304, the server monitors the client buffer to detect if packets having data encoded subject to the adjusted bit rate have reached the client buffer. The adjusted rate referred to in step 304 is the new bit rate resulting from a bit rate adjustment performed at step 208 of FIG. 2 (which had triggered the switch from the dynamic mode to the waiting mode.) A determination of whether packets encoded at a particular bit rate have yet reached the client buffer may be performed by examining data in the NSN and HRSN data fields. At step 306, so long as the packets with data encoded at the adjusted bit rate have not yet reached the client buffer, the server controls any further adjustments in bit rate by performing rate decreases based on the value (PT) representative of the amount of data currently within the client buffer while disabling any bit rate increases. At step 308, once packets with data encoded at the latest adjusted bit rate have reached the client buffer, the server switches back to the dynamic mode of FIG. 2. In other words, step 306 is only performed during a period of time between a previous rate adjustment (i.e. an up-switch or down-switch) and the point in time at which packets containing data encoded at the adjusted bit rate first reach the client buffer. During that period of time, rate increases are disabled. Hence, no up-switches are performed, regardless of the status of the client buffer. However, down-switches may still be performed. Down-switches may be performed in accordance with otherwise conventional techniques wherein PT is compared with a fixed $PT_{DOWN}$ threshold and a down-switch is executed if PT falls below $PT_{DOWN}$. Once packets with data encoded at the adjusted bit rate have reached the client buffer, then dynamic mode processing is again performed wherein both up-switches and down-switches are permitted.

Hence, up-switches are disabled once a bit rate adjustment has been made (either up or down) until packets containing data encoded subject to the adjusted bit rate are received by the client buffer. This prevents any further up-switches from being performed based upon intervening changes in playout length of the client buffer before the previous rate adjustment has had a chance to take effect. As explained above in the Summary section, circumstances can arise wherein the playout length of the client buffer changes before a previous bit rate adjustment has had a chance to take effect. Such changes can sometimes trigger additional up-switches, which are often unnecessary and counterproductive. Indeed, the bit rate is often increased to the point that a series of down-switches are required, which often cannot be performed fast enough to prevent a buffer overflow. On the other hand, in the waiting mode, down-switches may still be performed. Further down-switches are permitted to prevent the possibility of a rebuffering event, as rebuffering events should be avoided in all circumstances due to the high level of annoyance such events usually trigger within the end-user.

Note that a series of down-switches might be performed at step 306 before packets containing data encoded subject to the adjusted bit rate (i.e. the rate set at step 208 of FIG. 1) are finally received by the client buffer, triggering a switch back to the dynamic mode. In one example, when the server switches back to the dynamic mode, the new "current" rate used by the dynamic mode logic is the rate associated with the latest, i.e. the most recent, of the down-switches. In that example, if a series of down-switches are performed during the waiting mode, the server therefore does not update $PT_{CH}$ until packets sent pursuant to the latest of the down-switches have finally been received by the client buffer. In another example, when the server switches back to the dynamic mode, the new "current" rate used by the dynamic mode logic is instead the rate associated with the first of the down-switches made in the waiting mode. In that second example, if a series of down-switches are performed during the waiting mode, the server therefore updates $PT_{CH}$ as soon as packets sent pursuant to the first of the down-switches have been received by the client buffer.

Thus, FIGS. 2 and 3 summarize the dynamic and waiting modes of the invention. In the preferred implementation, the server is capable of implementing both modes and switches back and forth between the modes, as described, based upon when bit rate adjustments are performed and when packets with data encoded at the current bit rate reach the client buffer.

Figure 4:
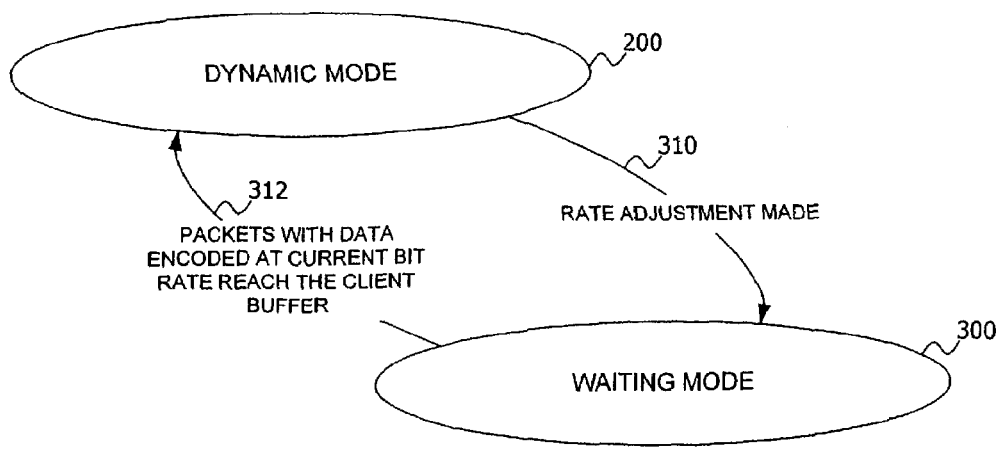
FIG. 4 is a state diagram providing an overview of the interrelation between the dynamic mode and the waiting mode.

FIG. 4 provides a state diagram summarizing the two modes of operation. The server remains in the dynamic mode 200 until a rate adjustment 310 (either up or down) is performed, which triggers a transition to the waiting mode. Thereafter, the server remains in the waiting mode until packets containing data encoded subject to the current bit rate reach the client buffer 312, which triggers a transition back to the dynamic mode. In this manner, the server operates in the optimal mode at all times so as to minimize unnecessary rate switches while working to prevent buffer overflows and, most importantly, working to prevent rebuffering events.

In other implementations, however, the server may be configured to implement either just the dynamic mode or just the waiting mode. If only the dynamic mode is implemented then, preferably, the server is configured to remain in the dynamic mode at all times. In other words, an adjustment to the bit rate (triggered, for example, at step 208 of FIG. 2) does not trigger a transition to any other mode. Rather, processing simply continues within the dynamic mode, with the server monitoring the client buffer to detect when packets containing data encoded subject to the adjusted bit rate reach the client buffer, then updating $PT_{CH}$ accordingly. If only the waiting mode is implemented, however, the server preferably does not remain in the waiting mode at all times (as that what prevent any up-switches from ever being performed). Rather, preferably, the server switches back and forth between a waiting mode and a normal mode of operation, wherein the normal mode may be an otherwise conventional mode of operation wherein fixed up-switch and down-switch thresholds are used in conjunction with playout length or client buffer fill levels. The normal mode may use rate estimation mechanisms well known in the art in addition to, or as an alternative to, the threshold mechanisms or FIG. 5. In other words, the system may be implemented in accordance with a state diagram similar to that of FIG. 4, but with the dynamic mode replaced with a normal mode.

Figure 5:
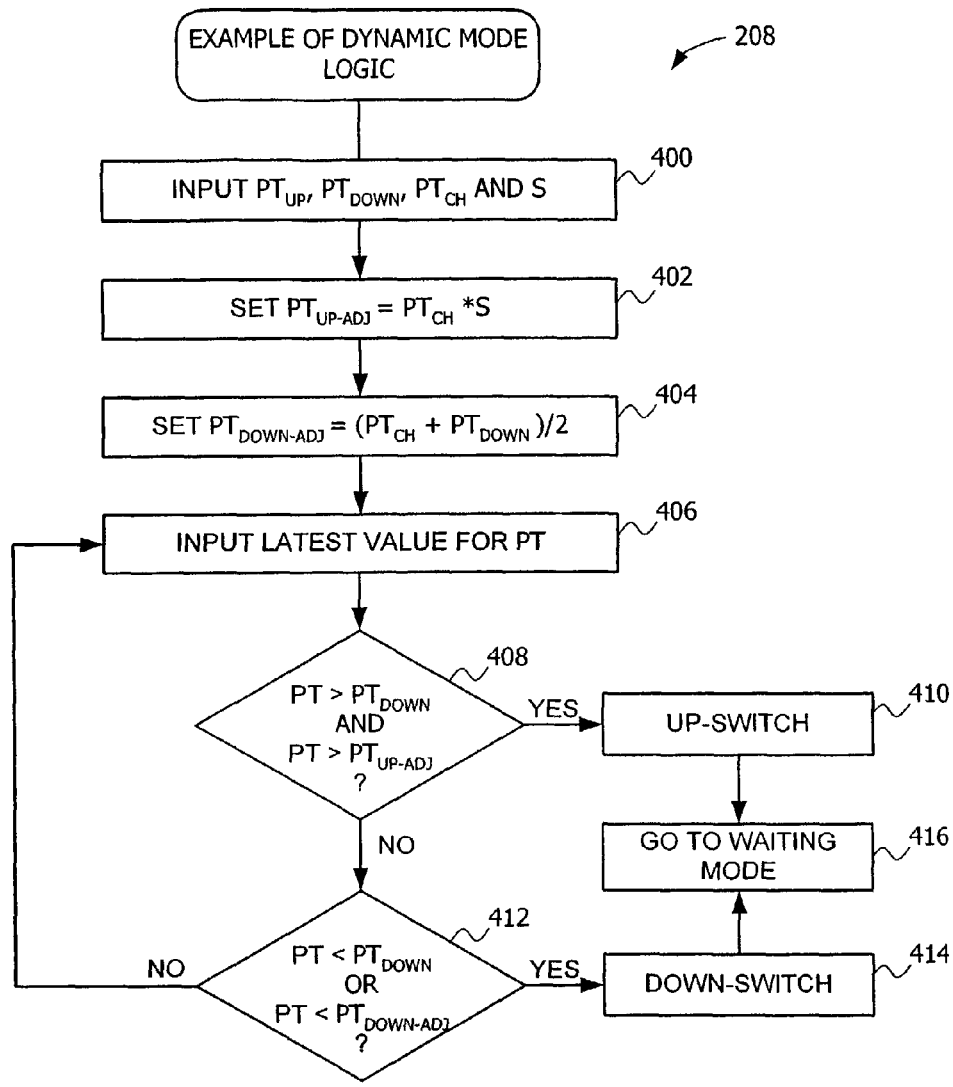
FIG. 5 is a process flow diagram illustrating an exemplary implementation of dynamic mode logic of the invention.

Turning now to FIG. 5, an exemplary implementation of dynamic mode logic for use at step two 208 of FIG. 2 will now be described. In the exemplary implementation, the reference value $PT_{CH}$ is representative of the amount of data within the client buffer at the point in time when packets sent at the current rate first reach the client buffer. In other examples, different reference points in time are instead used to detect the reference value $PT_{CH}$, such as reference points defined between a rate switch and the point when packets sent at a new rate first reach the client buffer and reference points defined after the packets sent at a new rate first reach the client buffer. Beginning at step 400, the server inputs values for $PT_{UP}$, $PT_{DOWN}$, $PT_{CH}$ and a safety value S. $PT_{UP}$ and $PT_{DOWN}$ are predetermined, fixed up-switch and down-switch thresholds, respectively, which may be set in accordance with otherwise conventional techniques. $PT_{CH}$ is the value determined at step 204 of FIG. 2, which is representative of the amount of data within the client buffer when packets containing data encoded subject to the current bit rate first reach the client buffer. S is a safety value, set greater than 1.0 and, in one example, said to 1.2. At step 402, the server sets an adjustable up-switch threshold ($PT_{UP\text{-}ADJ}$) equal to $PT_{CH}$ multiplied by the safety value S. At step 404, the server sets an adjustable down-switch threshold ($PT_{DOWN\text{-}ADJ}$) equal to $PT_{CH}$ plus $PT_{DOWN}$ all divided by two, i.e. $PT_{DOWN\text{-}ADJ}$ is set midway between $PT_{CH}$ and $PT_{DOWN}$. In general, $PT_{DOWN\text{-}ADJ}$ may be set at any point between $PT_{CH}$ and $PT_{DOWN}$.

Figure 6:
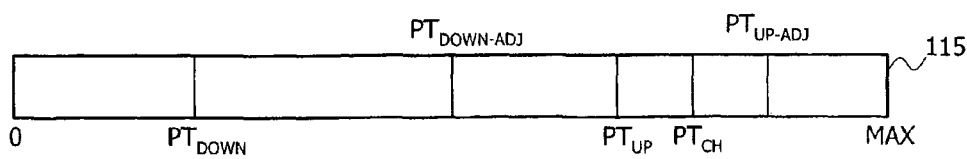
FIG. 6 is a block diagram of an exemplary client buffer, particularly illustrating various thresholds employed by the invention.

The thresholds are illustrated in FIG. 6, which provides a block diagram representation of client buffer 155 of FIG. 1. In the example of FIG. 6, $PT_{CH}$ was found by the server to be greater than $PT_{UP}$. Accordingly, $PT_{DOWN\text{-}ADJ}$, which is set midway between $PT_{CH}$ and $PT_{DOWN}$, is greater than $PT_{DOWN}$. If, instead, $PT_{CH}$ were found to be less than $PT_{DOWN}$, than $PT_{DOWN\text{-}ADJ}$ would likewise be less than $PT_{DOWN}$. Meanwhile, in example of FIG. 6, $PT_{UP\text{-}ADJ}$, which is equal to $PT_{CH}*S$, is greater than $PT_{UP}$. In other examples, if $PT_{CH}$ is instead considerably less than $PT_{UP}$, than $PT_{UP\text{-}ADJ}$ may be less than $PT_{UP}$. This depends on the precise value of $PT_{CH}$, as well as the value used for the safety factor S. Hence, depending upon the value of $PT_{CH}$ and other factors, the adjustable versions of $PT_{UP}$ and $PT_{DOWN}$ may either be greater than or less than their fixed counterparts. Note, also, that circumstances can arise wherein $PT_{CH}*S$ may be greater than the maximum value of client buffer (MAX). If that is the case, than $PT_{UP\text{-}ADJ}$ is simply set equal to MAX or to some other lesser, default value.

Returning to FIG. 5, at step 406, the server begins inputting values for PT, i.e. the current playout length of data already contained within the client buffer, tracked at step 206 of FIG. 2. If, at decision step 408, PT is greater than $PT_{DOWN}$ and PT is also greater than $PT_{UP\text{-}ADJ}$, then an up-switch is triggered at step 410. If not, then decision step 412 is performed wherein, if PT is less than $PT_{DOWN}$ or PT is less than $PT_{DOWN\text{-}ADJ}$, then a down-switch is triggered at step 414.

The logic of decision steps 408 and 412 may be represented as follows:

---

If PT > $PT_{DOWN}$ AND PT > $PT_{UP\text{-}ADJ}$ then
    Perform up-switch
    else if PT < $PT_{DOWN}$ OR PT < $PT_{DOWN\text{-}ADJ}$
    Perform down-switch
end if

--- where, as noted, $PT_{UP\text{-}ADJ} = PT_{CH}*S$ and $PT_{DOWN\text{-}ADJ} = (PT_{CH} + PT_{DOWN})/2.$ Hence, an up-switch is triggered if the current playout length (PT) of the client buffer exceeds the adjusted up-switch threshold ($PT_{UP-ADJ}$), assuming that PT also exceeds $PT_{DOWN}$. This latter condition prevents inappropriate up-switches in circumstances where a down-switch may be more appropriate. By triggering up-switches based upon the adjusted up-switch threshold, rather than on the fixed up-switch threshold, the server thereby takes into account the current status of the client buffer (as represented by PT) while also taking into account the dynamic change in status of the client buffer (via the adjustment of the up-switch threshold). This helps prevent other inappropriate up-switches.

Consider an example wherein the adjustable up-switch threshold is initially set exactly equal to the fixed up-switch threshold. Hence, if the playout length of client buffer exceeds that threshold level, an up-switch is performed. If the playout length then increases before the first packets sent with the higher bit rate reach the client buffer, the adjustable up-switch threshold will then be greater than the fixed threshold. In that case, a further up-switch will only be performed if the playout length exceeds the new, higher threshold value. In other words, it becomes more difficult for an up-switch to be triggered since a higher threshold value must be exceeded, thus delaying further up-switches in circumstances where such a delay is warranted. If the fixed up-switch threshold were instead used again, the increase in the playout length of client buffer would result in new value for PT that would again exceed the fixed threshold, thus triggering another up-switch. By resetting threshold based upon the playout length at the time packets are first received, only a still further increase in playout length can trigger another up-switch. The aforementioned safety factor is provided to ensure that a non-trivial increase in playout length relative to $PT_{CH}$ must occur before another up-switch is triggered. Thus, after a first up-switch, a further up-switch will be executed if the buffer playout length is still increasing, thereby avoiding unnecessary up-switches.

Now consider an example wherein the adjustable up-switch threshold is again initially set equal to the fixed up-switch threshold but where the playout length of client buffer then decreases significantly before the first packets sent with the higher bit rate reach the client buffer. In the case, the adjustable up-switch threshold will then be lower than the fixed threshold. In that case, a further up-switch will be performed if the playout length exceeds the new, lower threshold value (assuming it also exceeds the fixed $PT_{DOWN}$ threshold). In other words, it becomes easier for an up-switch to be triggered thus expediting further up-switches in circumstances where warranted.

Turning now to down-switches, a down-switch is triggered if the current playout length (PT) of the client buffer falls below either the fixed threshold $PT_{DOWN}$ or the adjusted down-switch threshold ($PT_{DOWN-ADJ}$). In other words, a down-switch is triggered if PT falls below the larger of the two down-switch thresholds. The fixed threshold is still used to trigger a down-switch so as to prevent a down-switch from being delayed so as to help prevent rebuffering events. However, a down-switch can be expedited, which occurs if PT falls below the adjusted down-switch threshold. As noted above, the adjusted down-switch threshold may turn out to be either above or below the fixed down-switch threshold. If it is below the fixed threshold, it is superfluous, as the fixed threshold is used to immediately trigger a down-switch anyway. However, if the adjustable down-switch threshold exceeds the fixed down-switch threshold, the adjustable down-switch threshold can then trigger an expedited down-switch, i.e. a down-switch that occurs in circumstances where a down-switch would not occur using conventional switching logic. The expedited down-switch occurs, as noted, if the playout length falls below the adjustable down-switch threshold.

If neither of the conditions of decision steps 408 and 412 are true, then processing returns to step 406 wherein the latest value for PT is input for applying to the various threshold values. Assuming, however, that either an up-switch or a down-switch is triggered, then step 416 is performed, wherein the server switches to the waiting mode, the logic of which will be described below with reference to FIG. 7.

To briefly summarize, the dynamic mode decision the logic of FIG. 5 provides a means for controlling adjustments in the bit rate of packets so as to switch to an increased bit rate if the amount of data currently within the client buffer exceeds an adjusted up-switch threshold set based on a value representative of the amount of data within the client buffer when packets containing data encoded subject to a current bit rate first reach is the client buffer. However, the switch to higher bit rate is only performed if the amount of data currently within the client buffer also exceeds a minimum threshold. The dynamic mode decision logic also provides a means for controlling adjustments in bit rate so as to switch to a lower bit rate if the amount of data currently within the client buffer falls below an adjusted down-switch threshold set based on the value representative of the amount of data within the client buffer when packets containing data encoded subject to a current bit rate first reach the client buffer.

Figure 7:
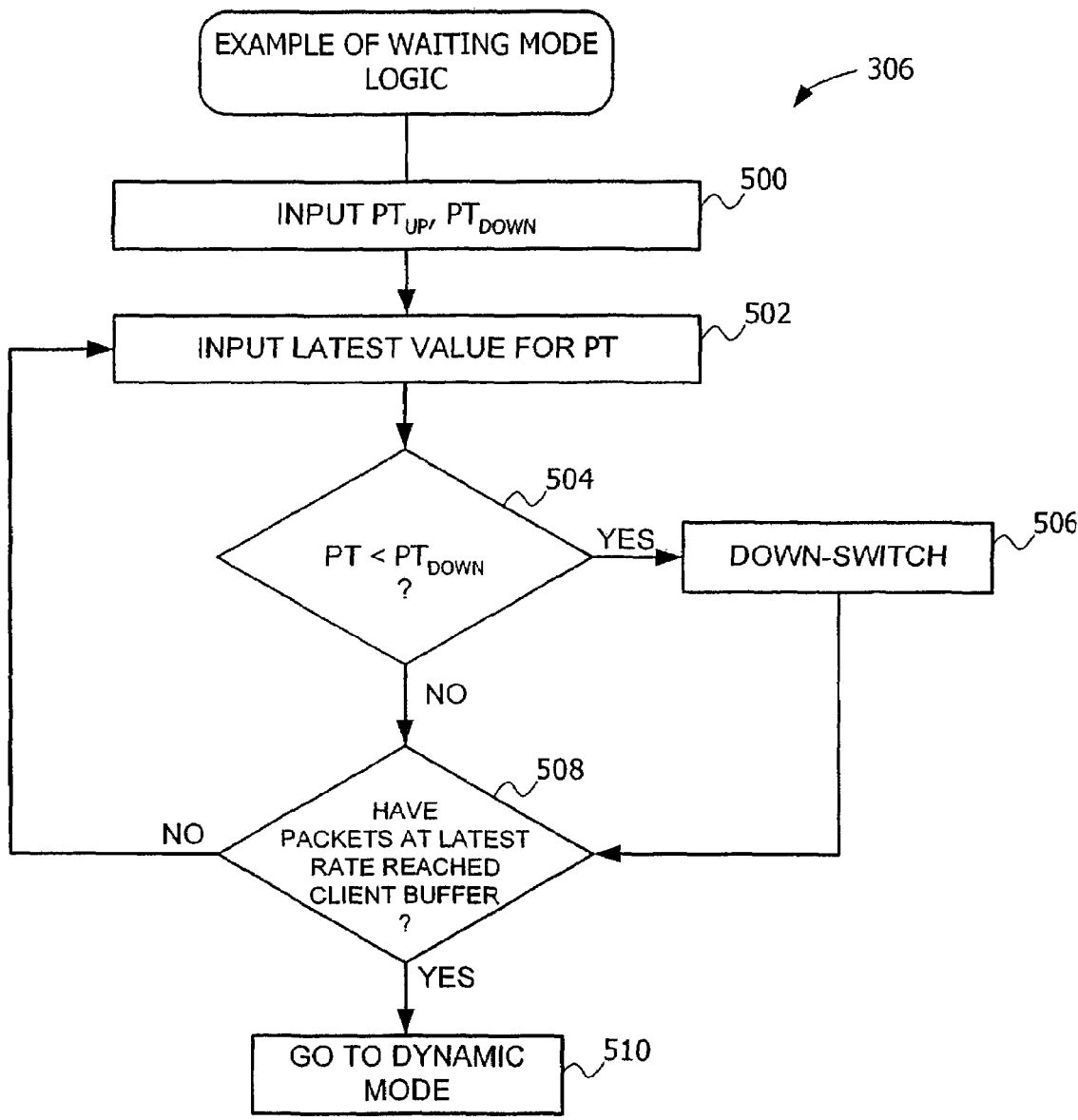
FIG. 7 is a process flow diagram illustrating an exemplary implementation of waiting mode logic of the invention.

Turning now to FIG. 7, a preferred implementation of waiting mode logic for use at step 306 of FIG. 3 will now be described. Beginning at step 500, the server inputs values for $PT_{UP}$ and $PT_{DOWN}$, which are the same fixed threshold values used in connection with FIG. 6. At step 502, the server begins inputting values for PT, i.e. the current playout length of data already contained within the client buffer, tracked at step 206 of FIG. 2. At decision step 504, if the playout length (PT) falls below $PT_{DOWN}$, a down-switch is triggered, step 506. If not, then at decision step 508, the server determines whether packets sent at the latest adjusted bit rate have reached the client buffer. If so, processing and immediate returns the dynamic mode, step 510. Otherwise, processing returns to step 502 wherein an updated value for the playout length is input for comparison at step 504 against the fixed down-switch threshold. What is particularly notable about the logic of FIG. 7 is that no comparisons are made relative to up-switch thresholds and no up-switches are performed. As already explained, up-switches are disabled during the waiting mode to prevent any unwarranted up-switches. Down-switches are triggered by the fixed down-switch threshold to ensure that down-switches are performed so as to avoid possible rebuffering events. In the waiting mode, adjustable threshold values are not used.

Thus, an exemplary method implementation has been described of a technique for adjusting the overall transmission rate of data in a packet-based system by increasing or decreasing the bit rate of the data encoded within the packets. The packet transmission rate typically is not changed, as it depends upon the bandwidth of the communication link. However, in other implementations, the packet transmission rate may be adjusted as well using, for example, adaptive techniques.

Figure 8:
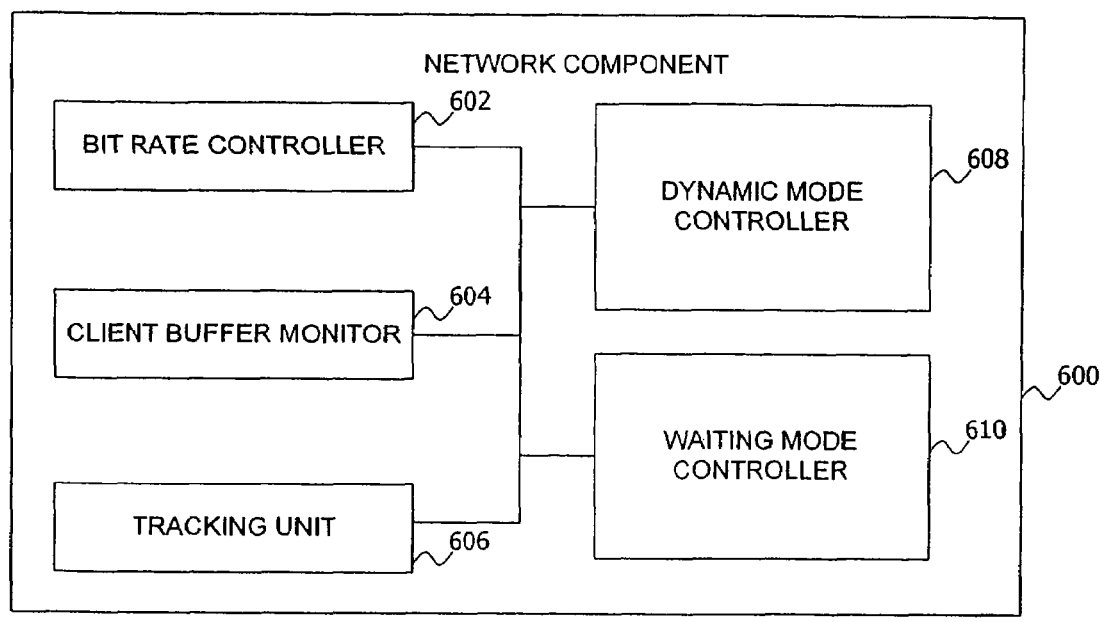
FIG. 8 is a block diagram illustrating an exemplary apparatus implementation of a server component of the invention.

Although the invention has been primarily described with reference to method implementations, apparatus implementations are also part of the invention. FIG. 8 illustrates, at a high-level, an exemplary apparatus implementation. Briefly, network component 600, which may be a part of server 105 of FIG. 1, includes a bit rate controller 602 for starting to transmit data in packets at a current bit rate and a client buffer monitor 604 for monitoring the client buffer to detect a reference value representative of an amount of data within the client buffer at a subsequent point in time such as when packets containing data encoded subject to a current bit rate first reached the client buffer. A tracking unit 606 tracks a value representative of an amount of data currently within the client buffer. A dynamic mode controller 608 is provided for controlling adjustments in the bit rate of packets based on the value representative of the amount of data currently within the client buffer and based on the reference value. The apparatus may also include a waiting mode controller 610 for controlling adjustments in the bit rate of packets in accordance with the waiting mode. In one example, dynamic mode controller 608 implements the dynamic mode logic of FIG. 5; whereas waiting mode controller 610 implements the waiting mode logic of FIG. 7. Other implementations may be provided which do not include dynamic mode controller 608 or which do not waiting mode controller 610.

As can be appreciated by one of ordinary skill in the art, the current invention and the techniques associated therewith provide an enhanced end user perceived experience for applications such as multimedia streaming by avoiding client buffer overflows and drainage.

Furthermore, the skilled artisan will also appreciate that there are many different techniques that may be used to determine client buffer fill levels, including estimations based on data within RRs and Sender Reports, and that the current invention may be implemented in parallel with a plurality of data packet streams simultaneously being buffered in one or more network buffers for transmission to one or more clients. Also, transmission rate control mechanisms may be use in addition to the up-switching described above to avoid buffer overflows. One of ordinary skill in the art will further appreciate that the invention may be implemented in and by various types of network components, such as network terminals, network nodes, and the like. In particular, the invention may be practiced by mobile terminals, proxies (that could divide the transmission path), and fixed terminals.

While the invention has been described with respect to particular embodiments, those skilled in the art will recognize that the invention is not limited to the specific embodiments described and illustrated herein. Therefore, while the invention has been described in relation to its preferred embodiments, it is to be understood that this disclosure is only illustrative. Accordingly, it is intended that the invention be limited only by the scope of the claims appended hereto.

The invention claimed is:

1. A method implemented by an apparatus for controlling packet transmissions from a server to a client having a client buffer, the method comprising the steps of:
    starting to transmit packets containing data encoded subject to a current bit rate;
    monitoring the client buffer to detect when packets containing data encoded subject to the current bit rate first reach the client buffer;
    detecting a reference value representative of an amount of data within the client buffer when the packets containing data encoded subject to the current bit rate first reached the client buffer;
    tracking a value representative of an amount of data currently within the client buffer; and
    controlling adjustments to the bit rate of data being transmitted in accordance with a dynamic mode based on the value representative of the amount of data currently within the client buffer and based on the reference value.

2. The method of claim 1, wherein the step of controlling adjustments in accordance with the dynamic mode includes the step of:
    switching to a higher bit rate if the amount of data currently within the client buffer exceeds an adjustable up-switch threshold set based on the reference value.

3. The method of claim 1, wherein the step of controlling adjustments in accordance with the dynamic mode includes the step of:
    switching to a lower bit rate if the amount of data currently within the client buffer falls below an adjustable down-switch threshold which is set based on the reference value.

4. The method of claim 1 wherein the step of controlling adjustments in the bit rate of packets in accordance with the dynamic mode is only performed after packets sent containing data encoded subject to the current bit rate have reached the client buffer.

5. The method of claim 1, wherein the value representative of the amount of data within the client buffer is representative of a playout length of the data or a buffer fill level.

6. The apparatus of claim 1, wherein the apparatus is configured as one of:
    a fixed network component;
    a mobile network component;
    a network server;
    a wireless terminal;
    an intermediary network node; and
    a proxy.

7. The method of claim 1, wherein the apparatus is configured as one of:
    a fixed network component;
    a mobile network component;
    a network server;
    a wireless terminal;
    an intermediary network node; or
    a proxy.

8. The method of claim 2, wherein the adjustable up-switch threshold is set equal to a predetermined safety margin multiplied by the reference value.

9. The method of claim 2, wherein the step of switching to a higher bit rate in the dynamic mode is only performed if the amount of data currently within the client buffer also exceeds a minimum threshold.

10. The method of claim 3 wherein the adjustable down-switch threshold is set approximately midway between a predetermined minimum threshold and the reference value.

11. The method of claim 3 wherein the step of switching to a lower bit rate in the dynamic mode is alternatively performed if the amount of data currently within the client buffer falls below the predetermined minimum threshold.

12. The method of claim 10 wherein the minimum threshold is a fixed down-switch threshold.

13. The method of claim 4, further including the step of controlling further adjustments in the bit rate of data in accordance with a waiting mode.

14. The method of claim 13, wherein the step of controlling further adjustments in the bit rate of data in accordance with the waiting mode is only performed after a rate adjustment and before packets sent containing data encoded subject to a newly adjusted bit rate have reached the client buffer.

15. The method of claim 14, wherein the step of controlling further adjustments in the bit rate of packets in accordance with the waiting mode includes the step of:
    switching to a lower bit rate if the amount of data currently within the client buffer falls below a fixed down-switch threshold.

16. The method of claim 14 wherein the step of controlling further adjustments in the bit rate of packets in accordance with the waiting mode includes the step of:

disabling increases in the bit rate.

17. An apparatus for controlling packet transmissions from a server to a client having a client buffer, the apparatus comprising:

a bit rate controller for starting to transmit data in packets at a current bit rate;

a client buffer monitor for monitoring the client buffer to detect when packets containing data encoded subject to the current bit rate first reach the client buffer and for detecting a reference value representative of an amount of data within the client buffer when the packets containing data encoded subject to the current bit rate first reached the client buffer;

a tracking unit for backing a value representative of an amount of data currently within the client buffer; and a dynamic mode controller for controlling adjustments in the bit rate of packets based on the value representative of the amount of data currently within the client buffer and based on the reference value.

* * * * *

UNITED STATES PATENT AND TRADEMARK OFFICE
CERTIFICATE OF CORRECTION

PATENT NO.        : 8,804,515 B2                                            Page 1 of 1
APPLICATION NO.   : 11/911246
DATED             : August 12, 2014
INVENTOR(S)       : Kampmann et al.

It is certified that error appears in the above-identified patent and that said Letters Patent is hereby corrected as shown below:

In the Drawings

In Fig. 4, Sheet 3 of 6, for Tag "310", in Line 1, delete "MADE" and insert -- MODE --, therefor.

In the Specification

In Column 4, Line 29, delete "(PTCH)." and insert -- $(PT_{CH})$. --, therefor.

In the Claims

In Column 14, Line 22, in Claim 6, delete "apparatus" and insert -- method --, therefor.

Signed and Sealed this
Second Day of June, 2015

Michelle K. Lee
*Director of the United States Patent and Trademark Office*